United States Patent [19]

Rose

[11] Patent Number: 5,626,748

[45] Date of Patent: May 6, 1997

[54] LIQUID SEPARATOR

[76] Inventor: William C. Rose, 6911 Harewood Rd., Baltimore, Md. 21220

[21] Appl. No.: 429,684

[22] Filed: Apr. 27, 1995

[51] Int. Cl.⁶ .................................................. C02F 1/40
[52] U.S. Cl. .......................... 210/241; 210/259; 210/265; 210/266; 210/DIG. 5
[58] Field of Search .................... 210/665, 259, 210/265, 266, DIG. 5, 241, 242.3, 242.4

[56] References Cited

U.S. PATENT DOCUMENTS

| | | | |
|---|---|---|---|
| 2,799,645 | 7/1957 | Musgrove | 210/521 |
| 3,463,172 | 8/1969 | Naylor | 210/521 |
| 3,558,482 | 1/1971 | De Young | 210/265 |
| 4,123,365 | 10/1978 | Middelbeek | 210/521 |
| 4,265,759 | 5/1981 | Verpalen et al. | 210/261 |
| 4,315,822 | 2/1982 | Jaisinhani | 210/DIG. 5 |
| 4,469,628 | 9/1984 | Simmons et al. | 210/688 |
| 4,591,441 | 5/1986 | Sakai | 210/DIG. 5 |
| 4,732,887 | 3/1988 | Obanawa et al. | 210/679 |
| 4,830,755 | 5/1989 | Hardin | 210/265 |
| 4,980,070 | 12/1990 | Lieberman | 210/DIG. 5 |
| 5,120,435 | 6/1992 | Fink | 210/192 |
| 5,196,117 | 3/1993 | Billiett et al. | 210/265 |
| 5,207,895 | 5/1993 | Basseen et al. | 210/265 |
| 5,225,073 | 7/1993 | Billiett et al. | 210/265 |
| 5,296,150 | 3/1994 | Taylor, Jr. | 210/DIG. 5 |
| 5,350,527 | 9/1994 | Kitko | 210/804 |

*Primary Examiner*—Cynthia L. Nessler

[57] ABSTRACT

This invention relates to waste water treatment, more specifically this invention relates to transportable decontamination system for water which is pumped from manholes and equipment vaults. The separation of water and contaminants is accomplished by a five module system. The first module removes 98% of the solids from the waste stream by use of staggered baffles. Module two reclamates the free oil present in the liquid flow with an coalescing water oil separator. The third module removes solids still left in the stream which are greater than 20 microns by use of a size discriminating filter. The fourth and fifth modules are bonding tanks used to encapsulate hydrocarbons and heavy metals respectively. The sequence in which the contaminated flow enters each of the modules is essential to the effectiveness and efficiency of the filtration process.

2 Claims, 5 Drawing Sheets

5,626,748

LIQUID SEPARATOR

BACKGROUND OF THE INVENTION

Treating waste water from a manhole or equipment vault is considerably more complex than treating an industrial waste water stream. In an industrial waste water stream, the contaminants in the water are usually constant and, once ascertained, a specific treatment process aimed at those contaminants can be implemented.

In contrast, contaminants in waste water from a manhole or equipment vault are varied in type and concentrations requiring treatment aimed at a multiplicity of contaminants. Furthermore, while industrial streams can implement permanent treatment facilities, treatment equipment for manholes and equipment vaults must be portable as the system will need to be transported to the various contamination sites.

Contaminants frequently present in waste water from a manhole or equipment vault are petroleum products, heavy metals, and a mixture of solids: dirt, leaves, cooking fats, etc. Due to the varying densities of these contaminants, as well as different cohesive and adhesive properties, the liquid in the manholes and equipment vaults will tend to separate into three (3) primary layers if left standing for a sufficiently long period of time.

The petroleum products are found in all three layers as they are present in various forms or states: free, dissolved, and emulsified. The presence of various petroleum states within a single waste water site creates severe problems for clarification as most petroleum removal devices and processes are not designed to remove more than a single petroleum state, which typically is the free oil state. Furthermore, these older designs are ineffective at removing emulsified and dissolved oils which are frequently present within the waste water of manholes and equipment vaults.

The heavy metals, also present in all three layers, are a similarly inconsistent group of contaminants. Varying type and concentrations of the metals renders any remediation method that is metal specific virtually useless.

Solids, typically present in the bottom layer, further complicate the decontamination process as these organic and inorganic materials must be removed before treatment of petroleum products and heavy metals can proceed.

SUMMARY OF THE INVENTION

This invention relates to a liquid separator. More particularly this invention relates to a liquid separator which is transportable for treating waste water from a manhole or equipment vault.

Presently, treatment of waste water systems are targeted at specific contaminants. However, waste water which is contained inside a manhole or equipment vault contains a multiplicity of foreign materials all with varying concentrations rendering a material specific treatment system virtually useless.

This present invention provides a treatment for waste water which is infected by a multiplicity of contaminants by combining several separation modules that differ in both their targeted contaminant and their process for filtering. The flow through of these tanks is strategically sequenced in a manner that allows for maximum efficiency and effectiveness in decontaminating.

The contaminated liquid is pumped into five (5) different separation tanks before being discharged as clean, filtered water. The first tank is a mechanical filtration method designed to remove positively and negatively buoyant material. The second tank is to remove neutrally buoyant material which the first tank is not designed to remove. The third tank utilizes a size discriminating filter to remove any small solids that may not have been filtered out in the first two tanks. The fourth tank is a contact chemical bonding tank designed to encapsulate hydrocarbons that are present within the liquid flow. The fifth and final tank is another contact chemical bonding tank aimed at bonding and removing heavy metals.

Once through the five filtering tanks, the process is complete and clean, filtered water will be discharged.

Therefore it is an object of this invention to provide a liquid separation device capable of effectively filtering the myriad of contaminants found in a settled water column.

It is another object of this invention to provide a treatment process for waste water that is found in manholes or equipment vaults.

It is still a further object of this invention to provide a liquid separation device which is self contained and mobile.

BRIEF DESCRIPTION OF THE DRAWINGS

The above and other objects, features, and advantages of the invention will become more readily apparent from the following with reference to the accompanying drawings in which.

DETAILED DESCRIPTIONS OF THE DRAWINGS

Figure 1:
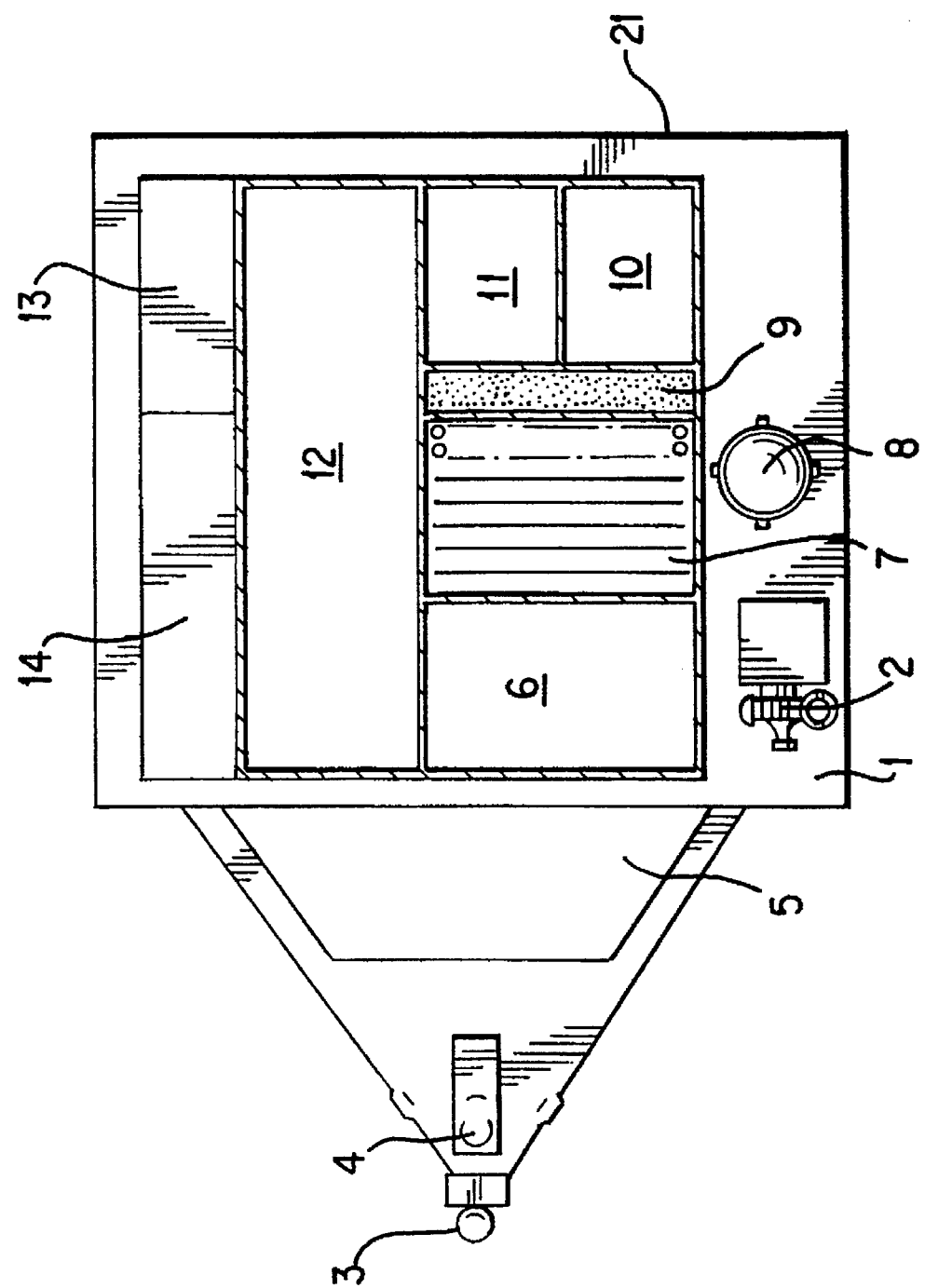
FIG. 1 is a top perspective view of the liquid separation system showing the configuration and location of the containing and separating tanks.
Figure 2:
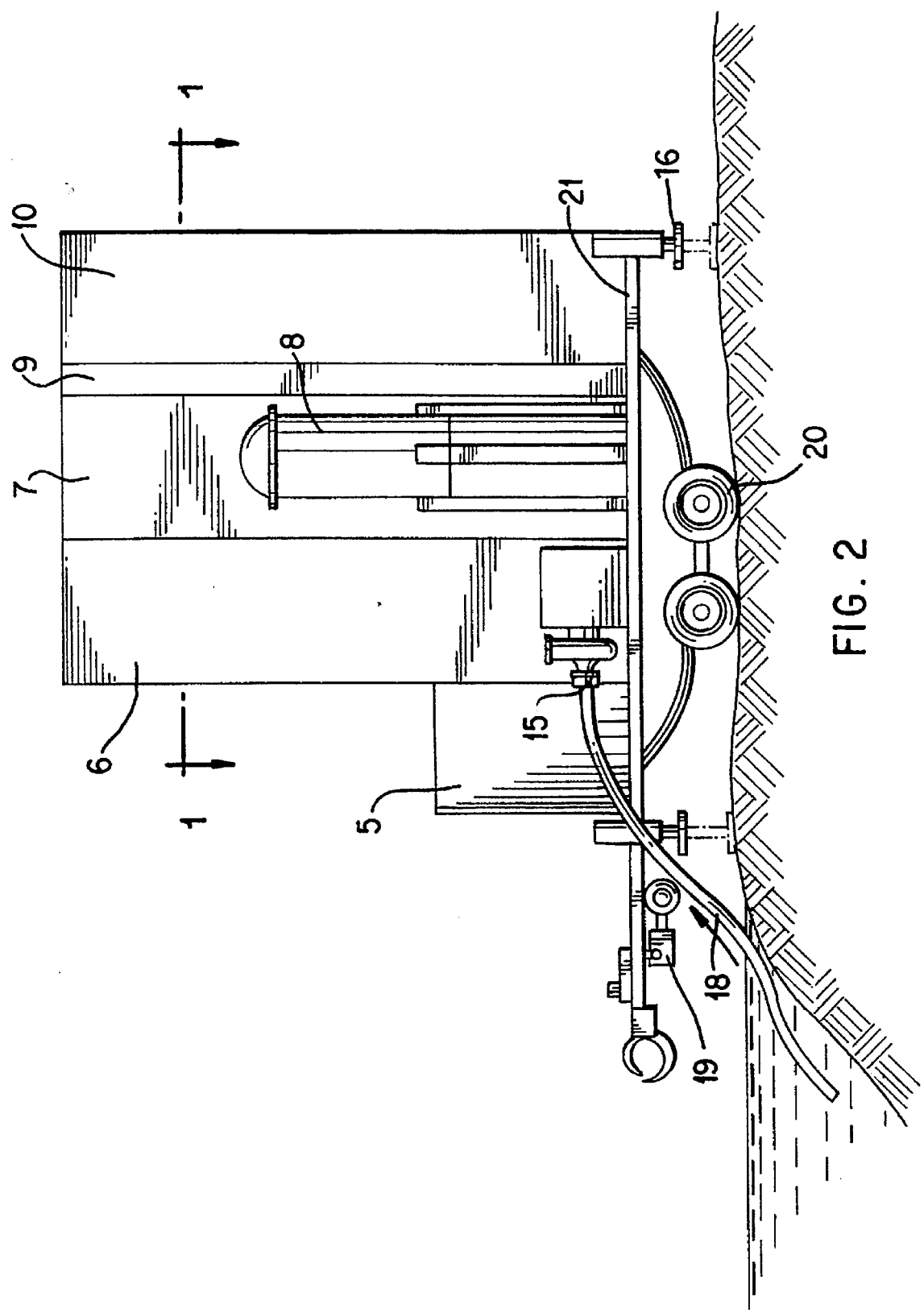
FIG. 2 is a left side elevation of the system of FIG. 1 showing the intake water hose and leveling post supports.

Referring now to FIGS. 1 and 2, there is shown a top view and left elevation of the entire liquid separation system. To facilitate mobility and portability, the system is mounted onto a towable trailer 1. The trailer 1 is equipped with four wheels 20, two on each side suspended by leaf type springs 17, a master cylinder 4, which operates the trailer's 1 surge brakes, and a towing hitch of the type commonly used on trailers. A fifth dolly wheel 19 is incorporated near the trailer's 1 hitch for non-towing mobility.

The trailer 1 is a standard flat bed with a two inch drip lip 21 surrounding its perimeter to prevent gross spills. Four inch drip lips, not shown in the Figures, are strategically placed under all connecting hoses for catching spillage due to hose integrity failure. Four leveling posts 16 are placed at each corner of the trailer 1 bed to relieve the weight of the water from the springs 17 of the trailer 1 while the system is in operation. A hydraulic jack, not shown in the Figures, is included with this system to level the trailer 1 prior to operation.

FIGS. 1 and 2 also show the proper locations for which the separation tanks 6, 7, 8, 10, 11, 12, waste tanks 5, 13, storage tank 14, intake hose 4, and on board intake pump 2 will be permanently mounted on the trailer 1. This configuration allows the contaminated water to flow through the proper sequence of separation tanks with minimal piping and provides the order of tanks which yields the greatest effectiveness for decontaminating the liquid. The flow sequence of the contaminated liquid will be demonstrated below and by reference to FIG. 2.

Once the device is transported to the proper site, the trailer 1 is stabilized by the leveling posts 16 and the intake hose 18 is placed into the contaminated liquid to begin the separation process. The contaminated liquid is suctioned by the intake pump 2 into the vertical plate separator 6. It then passes through the vertical tube coalescent tank, its baffle 28, and discharges into the bag filter 8. Once through the bag filter 8, the contaminated liquid will enter one of two twin hydrocarbon encapsulation tanks 10 or 11 and discharge into the heavy metal salvage tank 12. The discharge from the heavy metal salvage tank 12 will be decontaminated water.

The additional tanks which reside on the trailer 1, and are seen in FIG. 2, are: a) a waste oil tank 5, used to store waste oil separated in the vertical plate and vertical coalescing tanks 6, 7; b) a waste stowage tank 6, used to store solid waste; and c) a tool/spare part locker.

A wand, not shown in the figures, with a high velocity nozzle also resides on the trailer 1. It is connected to the liquid flow and is used to stir up the bottom layer of the contaminated water site so that fine solids can be pumped through the system for removal.

The sequence in which the contaminated liquid travels through the tanks is vital to the effectiveness of the filtering process. The sequence's importance will become more apparent after the following detailed discussion of the individual separation tanks. Each tank will be discussed in the order in which they receive contaminated liquid from the intake pump 2.

Refer to FIGS. 1 and 2 to follow the general liquid flow throughout the system while referring to FIGS. 3 to 6 for details of each component.

When operating, the on board intake pump 2 discharges contaminated liquid into a manifold, not shown in the Figures, for distribution throughout the system. The liquid is suctioned by the intake pump 2 through ten foot sections of four inch rigid hosing 18 with cam-lok connections which is carried on board the trailer in the tool/spare part locker. The pump 2 will provide the system with its design requirements of 25 to 50 gallons per minute of contaminated liquid.

The vertical plate separation tank 6 and the vertical tube coalescing tank 7 are the first and second tanks, respectively, to receive the contaminated liquid from the distribution manifold. The internals of these tanks can be seen by referring the cross sectional view of FIG. 3. The contaminated liquid is first pumped through the inlet 23 for the vertical plate separation/vertical tube coalescing tank, into the vertical plate separation tank 6. Once inside, the liquid flow is met by the tank's sediment chamber baffles 24, which are vertical plates designed to induce a siniodal wave flow pattern in the liquid, that forces non-aqueous material in the liquid to build up kinetic energy. This causes any positively buoyant material to continue to the top of the container when the liquid reaches the top of a turn through the baffles 24, and negatively buoyant material to continue to the bottom of the container when the liquid reaches the bottom of a turn through the baffles 24.

Positively buoyant material, usually oil, gathered at the top of the chamber will be removed by a skimmer tube 26 and emptied, through the skimmer tube discharge 25, into the waste oil storage tank 5. To facilitate ease in cleaning the bottom of the tank, the vertical plates 24 are removable through slide channels on the inside of the tank wall.

Figure 3:
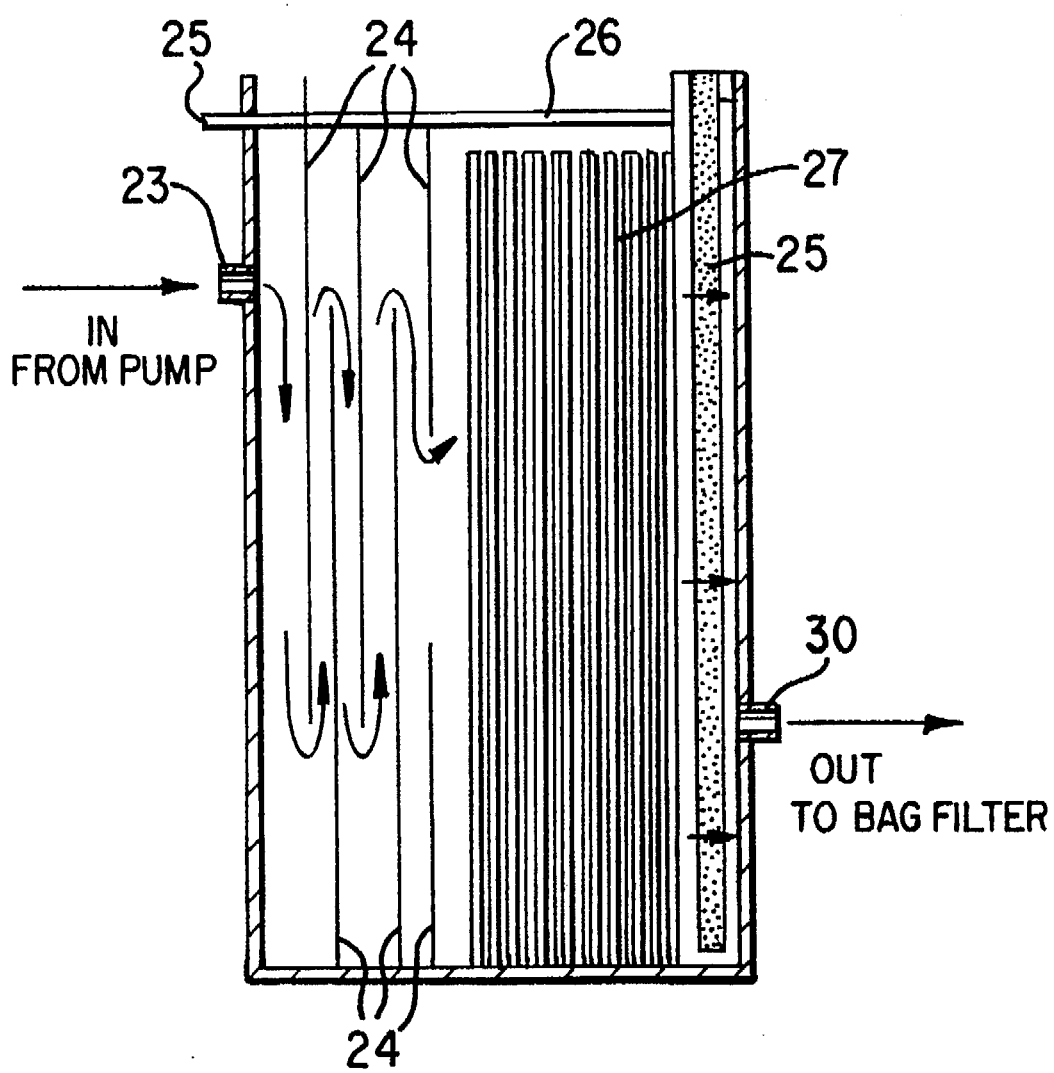
FIG. 3 is a cross sectional view of the vertical plate separation and vertical tube coalescing tanks, two components of the system of FIG. 1.
Figure 4:
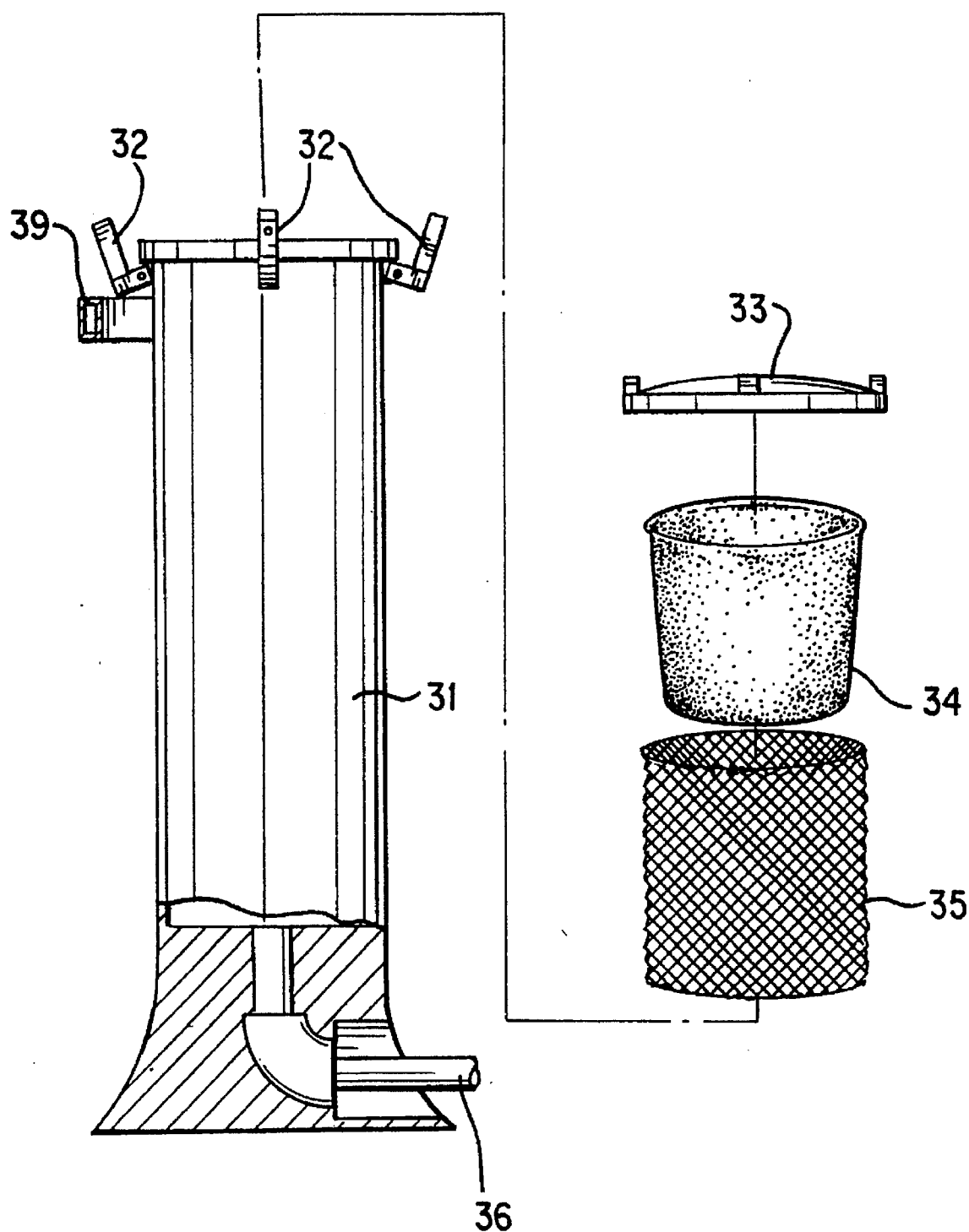
FIG. 4 is an exploded view the bag filter, a component of the system of FIG. 1.

While the vertical plate separator 6 will separate material that is positively or negatively buoyant, material which is neutrally buoyant, due to its specific gravity being close to that of water, will not be separated in this tank. To separate this neutrally buoyant material which is mainly free oil, the contaminated liquid passes through the vertical coalescing tank 7 next. A cross section of this tank is seen in FIG. 3.

The vertical coalescing tank utilizes a hydrophobic and oliophilic vertical tube coalescing bundle 27 which allows water to pass but stops free oil from progressing. Oil in the liquid is absorbed upon contact with the tube coalescing bundle 27. The sudden deceleration experienced by the liquid, due to the contact with the coalescing bundle 27, coalesces the small droplets of oil into larger droplets which float to the top of the tank and are removed by the skimmer tube 26.

Once the liquid passes through the vertical tube coalescing tank 7, it enters a baffle tank 9, and then discharges into a bag filter 8 through the vertical tube coalescing tank outlet 30. The contaminated liquid enters the bag filter 8, shown in FIG. 4, through the bag filter inlet 39, located at the top of the bag filter canister 31. The liquid is then strained through a porous filter 34 housed in a rigid forming screen 35. The forming screen ensures the bag filter 34 will maintain its shape integrity and thus provide a uniform layer of filter along a cross section of the bag filter canister 31.

The bag filter 34 will require periodic replacement it becomes full. Replacing the filter 34 will require only that the bag filter canister 31 be drained. Once drained, the canister 31 is opened by removing the lid 33 which is secured by four equidistant quick release clasps 32. The filled bag filter 34 is then removed, disposed of in the waste storage tank 13, and a spare bag filter 34, stored in the tool/spare part locker 14, is placed into the forming screen 35. The canister lid 33 is then replaced and secured, and the liquid flow is allowed to resume.

The bag filter 8 is intended to remove any free oil or small solids that may not have been successfully separated and removed in the first two tanks before the liquid enters the heavy metal salvage tank 12 or the hydrocarbon encapsulation tank 10. Removal of any remaining solid contaminants before entering the final two separation tanks is essential to the decontamination process as these two final tanks utilize bonding agents which entrap specific materials through contact. Any particles that are present within the two final tanks will severely degrade the effectiveness of this process by inhibiting contact between the bonding agents and the target materials.

Once the remaining solids and free oil are filtered out of the liquid flow by the bag filter 8, the liquid discharges, through the bag filter outlet 36, to one of the two hydrocarbon encapsulation tanks 10, 11. These tanks filter out any dissolved or emulsified polar hydrocarbons, as they will not be removed in the first three tanks, by use of a hydrocarbon bonding agent.

Figure 5:
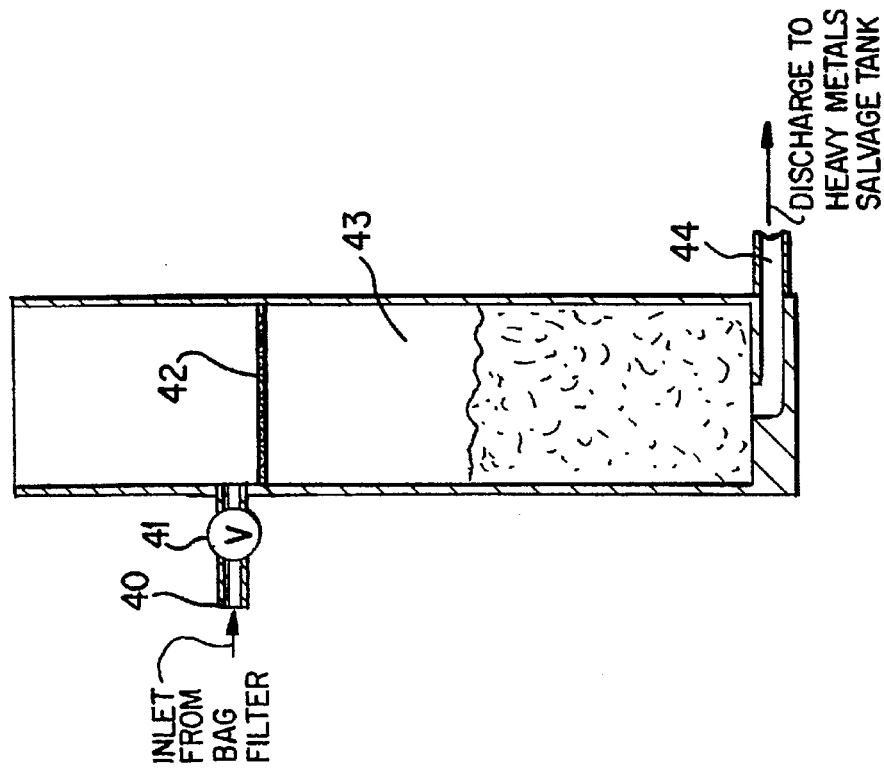
FIG. 5 is an cross sectional view of one of the two hydrocarbon encapsulation tank, components of the system of FIG. 1.

FIG. 5 shows a cross section of one of the two identical hydrocarbon encapsulation tanks 10, 11. The liquid flow enters the primary hydrocarbon encapsulation tank 10 through the hydrocarbon encapsulation tank inlet 40 where it is met by a disbursal screen. This interior screening 42 serves as a filtrate retention and hold down as well as increasing the surface area of the incoming liquid entering the absorption section 43. The absorption section 43 is filled with the hydrocarbon bonding agent, hydrocarbon encapsulating polymer filtrate. The polymer, combined with activated charcoal which facilitates flow through the filter bed, adsorbs, absorbs, encapsulates, and bonds any hydrocarbon that the filtrate comes in contact with. To determine the required filter bed size for proper bonding in gallons, the flow rate of liquid, in gallons per minute, is multiplied by five (5) minutes, the contact time required for proper bonding of hydrocarbons.

Two hydrocarbon encapsulating tanks 10, 11 are used in this system to prevent a total shutdown of the system when the filtrate bed in the absorption section 43 of the primary tank has been exhausted. Exhaustion of the bed is not predictable due to the varying rates of hydrocarbon contamination; therefore, to avoid shutdown, the liquid flowing from the bag filter 8 is sent to the secondary hydrocarbon encapsulating tank 11 upon exhaustion of the filtrate bed in the primary tank 10.

To accomplish the tank switch during operation, a pipe spool piece, filled with a hydrocarbon encapsulating material that turns solid when in contact with hydrocarbons, will plug the discharge line 44 of the primary tank 10 when the encapsulating bed is expended. Since the flow rate has been stopped by the spool plug, the level in the first tank, the vertical plate separation tank 6, will rise until a safety float, not shown in the figures, shuts down the intake pump 2. When this occurs a piping bypass valve is opened which directs the liquid flow to the secondary tank 11. The secondary tank 11 also has a pipe spool safety piece to prevent any discharge of hydrocarbon contaminated liquid due to filtrate bed exhaustion.

Since the bonding media used to encapsulate the hydrocarbons is not effective on heavy metal contaminants, the liquid will need to be exposed to the ceramic ion exchange heavy metal bonding filtrate media 48 contained in the heavy metal bonding tank 12.

Figure 6:
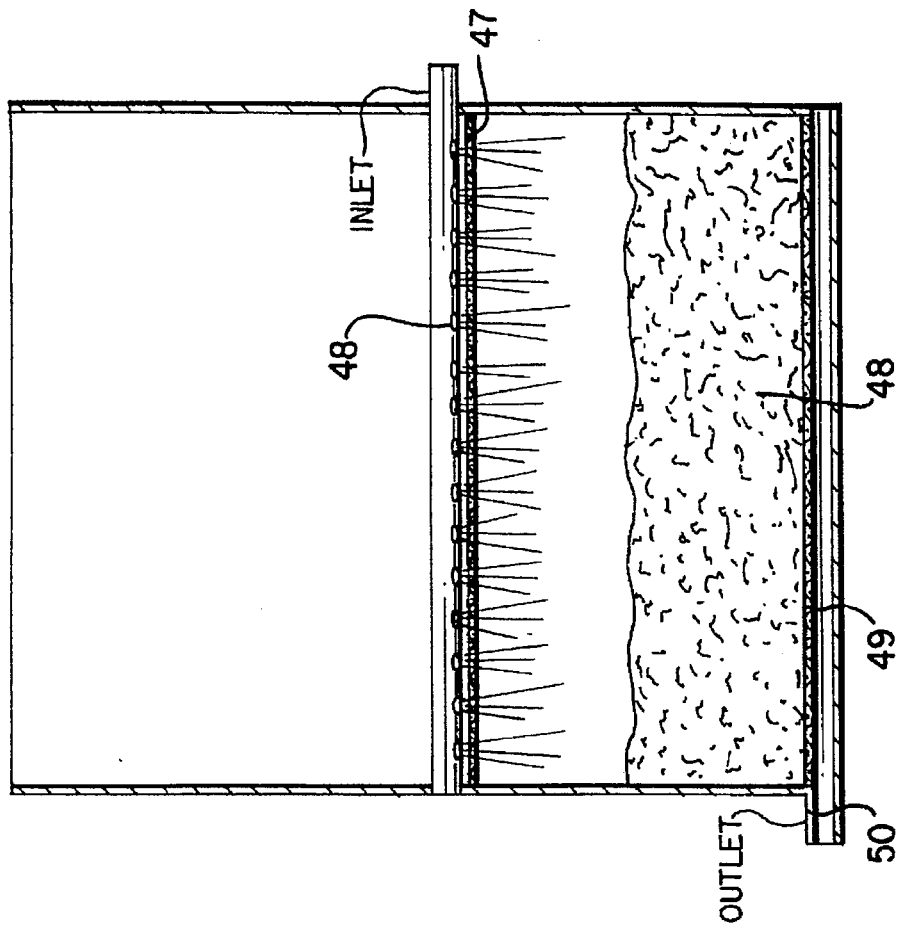
FIG. 6 is a cross sectional view of the heavy metals bonding and salvage tank, a component of the system of FIG. 1.

The hydrocarbon encapsulating tanks 10, 11 will discharge the liquid flow through the hydrocarbon encapsulation tank outlet 44 into the heavy metals bonding tank 12. FIG. 6 shows a cross sectional view of the heavy metal bonding tank 12.

The liquid enters the heavy metal bonding tank 12 through the tank's inlet 45, where it is sprayed through a pipe 46 containing many small outlet holes. The sprayed liquid then travels through a disbursal screen, and mixes with the ceramic ion exchange heavy metal bonding filtrate media 48. To be effective in removing heavy metals, the liquid must be in contact with the filtrate bed for ten (10) minutes; therefore, the flow rate in gallons per minute is multiplied by ten (10) to determine filtrate bed size 48 in gallons.

The heavy metals bonding tank 12, will not need a backup tank as the life of the filtrate bed is significantly longer than that of the hydrocarbon encapsulating tanks 10, 11. Furthermore, it is possible to test the condition of the heavy metal encapsulating bed 48 with equipment supplied in the tool/spare part locker 14.

Discharge from the heavy metals bonding tank 12, through the tank's outlet 50, will be uncontaminated, filtered water.

Due to the corrosive properties of the heavy metals that will be contaminating the liquid to be treated and the inevitable leaks or spills that may occur, the entire unit and all tanks are to be constructed out of 304 Stainless Steel. The good strength to weight ratio of this particular metal will also aid in portability.

All tanks are open to the atmosphere rather than pressurized. A pressurized system offers little or no operation advantage over the less costly open gravity. Further, a open gravity system cannot be over-pressurized as can a pressurized system.

The preceding description represents this invention in its preferred embodiment. It is understood that this invention could be permanent, pressurized, or used for clarification of water in other uses other than manholes or equipment vaults without departing from the scope of the claims of this invention.

What is claimed is:

1. A liquid separating device, comprising:

a vertical plate separator for separating positively and negatively buoyant contaminants from a liquid;

a vertical coalescing tank containing a vertical coalescing bundle for separating neutrally buoyant contaminants from said liquid attached to and downstream from said vertical plate separator;

a skimmer tube connected to said vertical coalescing tank for removing neutrally buoyant material from said vertical coalescing tank;

a bag filter for discriminating contaminants by size from said liquid attached to and downstream from said vertical coalescing tank;

a hydrocarbon encapsulation tank containing a hydrocarbon bonding media for removing hydrocarbons from said liquid attached to and downstream from said bag filter; and a heavy metals bonding tank containing a heavy metal bonding media for removing heavy metals from said liquid attached to and downstream from said hydrocarbon encapsulation tank.

2. A liquid separating device as recited in claim 1, further comprising a means for transporting said device.

\* \* \* \* \*

UNITED STATES PATENT AND TRADEMARK OFFICE
CERTIFICATE OF CORRECTION

PATENT NO. : 5,626,748
DATED : May 6, 1997
INVENTOR(S) : William C. Rose

It is certified that error appears in the above-identified patent and that said Letters Patent is hereby corrected as shown below:

On the title page, under item [56], insert -- Attorney, Agent or Firm: Walter G. Finch --

Signed and Sealed this

Second Day of December, 1997

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,626,748
DATED : May 6, 1997
INVENTOR(S) : William C. Rose

It is certified that error appears in the above-identified patent and that said Letters Patent is hereby corrected as shown below:

On the title page, under item [56], delete -- Attorney, Agent or Firm: Walter G. Finch --

This certificate supersedes Certificate of Correction issued December 2, 1997, the number was erroneously mentioed and should be deleted since no Certificate of Correction was granted.

Signed and Sealed this

Seventeenth Day of February, 1998

Attest:

BRUCE LEHMAN

Attesting Officer        Commissioner of Patents and Trademarks